Patented July 29, 1930

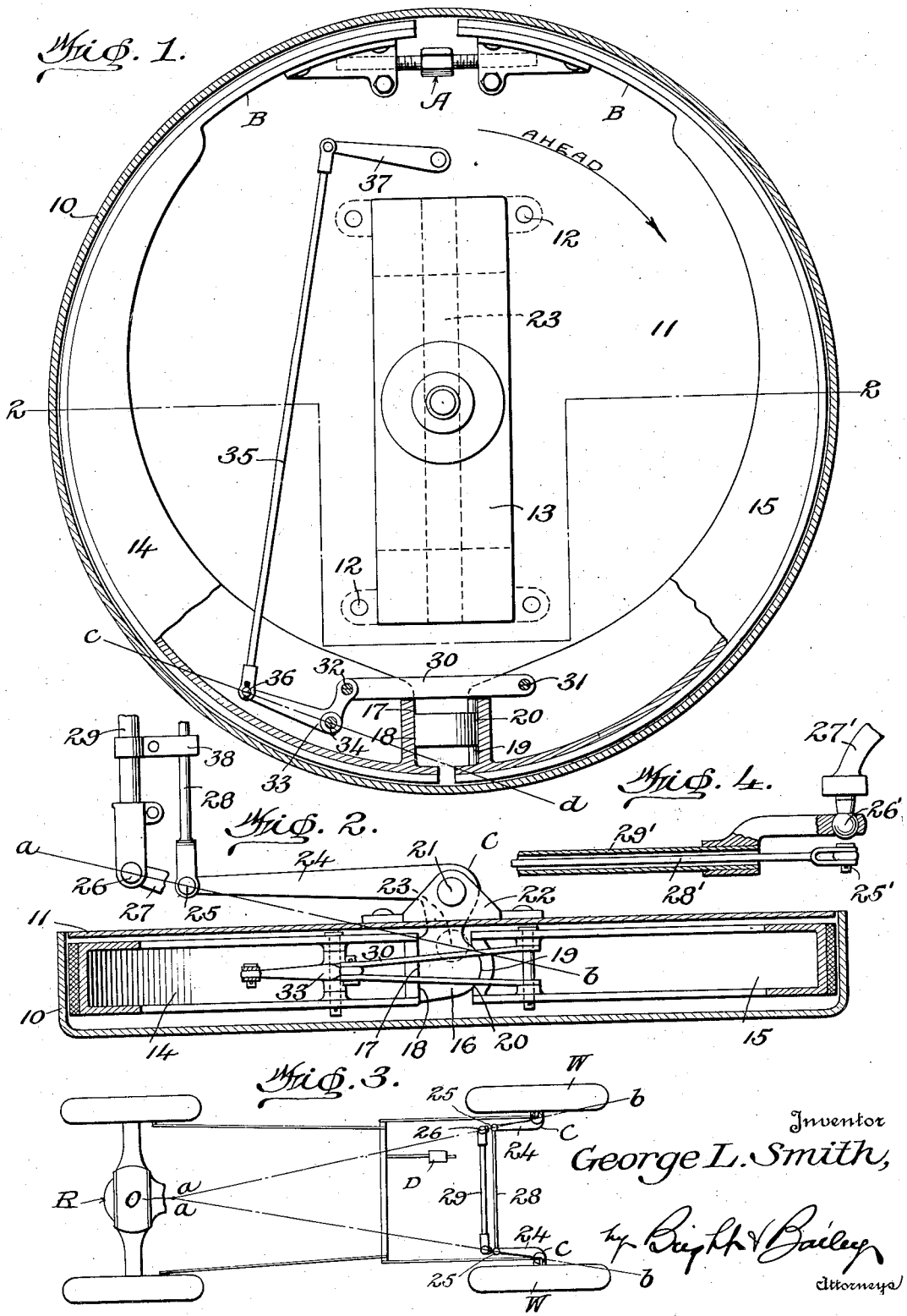

1,771,969

UNITED STATES PATENT OFFICE

GEORGE L. SMITH, OF WASHINGTON, DISTRICT OF COLUMBIA, ASSIGNOR TO UNITED STATES ORDNANCE COMPANY, OF WASHINGTON, DISTRICT OF COLUMBIA, A CORPORATION OF VIRGINIA

BRAKE MECHANISM

Application filed December 5, 1928. Serial No. 323,922.

As is well-known, a brake of the so-called full wrap type, that is, a brake which extends substantially 360° with respect to a related drum and has its anchor located at one end thereof, as distinguished from a brake of the so-called half wrap or other type, in which the anchor is located intermediate the ends of the brake, develops maximum braking power for a given pressure exerted to apply it. At the same time it also is well known that a brake of the full wrap type, especially an internal brake of this type, is inclined to be very erratic in its action due to the fact that slight variations in the coefficient of friction between the brake lining and a related drum produce extensive changes in the power of the brake. Accordingly it is the purpose of my present invention to provide means to equalize the braking effects of a pair of full-wrap brakes, that is, to provide means to reduce the pressure on the brake where the brake power is high and to correspondingly increase the pressure on the brake where brake power is low, whereby fluctuations in the combined power of the brakes for any given brake applying pressure are reduced to a marked degree and whereby the braking effect of each brake is maintained substantially the same as the other.

It also is my purpose to provide a brake actuating mechanism which will apply a brake actuating force in a direction to reduce to a minimum the liability of the brakes grabbing or locking when applied.

In my prior Patent 1,490,642, issued April 15, 1924, the brake bands are permitted a limited amount of free rotation to move the compensating links off of their dead centers. In my present invention I avoid this free rotation and consequently reduce to a minimum the movement of the brake actuating mechanism necessary to apply the brakes by placing the bell-crank arms between the ends of the brakes, so that when the brakes are expanded, clearances are provided for the swinging movement of the bell-cranks.

In my aforesaid prior patent the equalizing bell-cranks are swung with respect to the steering wheels when the latter are moved angularly to effect steering, the result being that although the brakes may be equal in braking power for straight ahead travel of the vehicle, angular steering movements of the wheels will tend to further apply the brakes. Accordingly it is another purpose of my present invention so to arrange the equalizing bell-cranks as to eliminate any swinging movement of said bell-cranks with respect to their related wheels due to the latter being swung angularly to effect steering.

The equalizing cross rod employed to connect the equalizing bell-cranks of my invention at times operates in tension and at other times in compression and it is another of my present purposes to provide means to avoid the danger of said rod becoming bent as a result of operating in compression.

With the foregoing and other purposes in view, my invention consists in the novel features of construction, combination and arrangement of parts as will be hereinafter more fully described, illustrated in the accompanying drawings and defined in the appended claims.

In the drawings, wherein like characters of reference denote corresponding parts in the different views—

Fig. 1 is a side elevation partly in section, of a brake embodying the novel features of my present invention, the illustration being of a right front brake as viewed from a point to the right thereof;

Fig. 2, a section on the line 2—2 of Fig. 1;

Fig. 3, a diagrammatic view illustrating in particular the relation of my torque equalizing mechanism to the steering wheels and steering mechanism of a vehicle; and Fig. 4, a detail sectional view showing my torque equalizing cross rod housed within a tubular tie rod.

Referring to the drawings in detail, 10 designates a brake drum mounted in the usual manner on a wheel, not shown, while 11 designates a backing plate bolted or otherwise secured as at 12 to a steering knuckle 13. The brake, which is of the full wrap type, is composed in this instance of two flexible shoes 14 and 15 joined together at their upper ends by any suitable adjusting device A and formed at their lower ends to rest against opposite sides of the short arm 16 of an equalizing bell-crank C, the end 17 of one of the shoes, shoe 14 in this instance, being straight to match the straight face 18 of the arm 16 of the bell-crank, and the end 19 of the other shoe, shoe 15 in this instance, being curved to match the curved or pivoting face 20 of the arm 16 of the bell-crank, which curved or pivoting face is opposite the face 18. These flexible shoes partake of the nature of an expanding brake band at the portions B, but are of increasing stiffness approaching their lower ends due to side flanges of increasing depth. They can therefore be called reinforced bands as well as flexible shoes, and more correctly so, as shoes usually require pivotal connections to the backing plate 11, whereas the brakes shown do not require such connections.

The bell-crank C is pivoted as at 21 to a bracket 22 which is secured to the backing plate 11, the pivot 21 being located abreast the usual king pin 23 and at such a distance away from it that the long arm 24 of the bell-crank may be laid parallel or in other suitable spaced relation to the backing plate 11 so as to permit said arm to swing, said arm terminating in a pivot 25 which is located, when the wheel with which the brake is associated is in straight ahead position, on a line $a$—$b$ passing through the center of the king pin 23 and the tie rod pivot 26 at the outer end of the usual steering arm 27.

Referring particularly to Fig. 3 of the drawings which illustrates a pair of steering wheel brakes operatively connected with one another, it will be observed that the pivots 25 at the outer ends of the bell-crank arms 24 are connected together by an equalizing cross rod 28 and that the pivots 26 at the outer ends of the steering arms 27 are connected together by a steering tie rod 29. Also, it will be observed that with the steering wheels W positioned for straight ahead travel, the lines $a$—$b$, when extended, intersect at a point O a short distance forwardly of the rear axle R. Obviously, therefore, the length of the steering arms 27, whether said arms extend forwardly or rearwardly with respect to the steering wheels W, may be varied without affecting steering movements of the wheels W for any given angular movement of an associated steering wheel, provided the pivots 26 are located on the lines $a$—$b$, respectively, as aforesaid. Obviously, too, due to the fact that the bell-cranks C are mounted on the backing plates 11 so as to swing with the wheels W, it follows that so long as the pivots 25 are located on the lines $a$—$b$, no pivoting movement of the bell-cranks with respect to the wheels W will occur as a result of the wheels W being moved angularly to effect steering. Manifestly, therefore, the length of the arms 24 of the bell-cranks may also be varied without affecting the relation of the parts of the brakes when the wheels W are swung angularly to effect steering, provided the pivots 25 are, as aforesaid, located on the lines $a$—$b$ when the wheels W are positioned for straight ahead travel. Thus it is apparent that with the brakes unapplied no brake applying movement will be imparted to the shoes 14, 15 due to the wheels W being swung angularly to effect steering, as would be the case if the parts of the mechanism were so relatively arranged that pivotal movements of the bell-crank C with respect to the wheel W occurred when angular steering movements were imparted to the wheels.

For expanding the shoes 14, 15 into braking engagement with the drums 10 I provide for each brake a toggle mechanism consisting of a thrust link 30 disposed horizontally above the arm 16 of the bell-crank C and pivoted at one end, as at 31, to one of the shoes 14 or 15, to shoe 15 in this instance, and at its other end, as at 32, to one arm of a bell-crank 33 which is pivoted, as at 34, to the other of said shoes, a vertically extending pull rod 35 being pivoted at its lower end to the second arm of said bell-crank 33, as at 36, and at its upper end to a lever 37, which lever is pivoted over the head of the king pin 23 and is adapted for connection in any suitable or preferred manner with a pedal, lever or other brake actuating device D as shown in Fig. 3 of the drawings.

As illustrated in Fig. 1 of the drawings, the relative arrangement of thrust link 30, bell-crank 33 and pull rod 35 is such that thrust on pivot 34 when the brake is applied, is in a direction, indicated by line $c$—$d$, parallel or substantially parallel to a tangent to the brake drum at a point near said pivot, which is, as experiments have shown, the most effective direction in producing braking pressure and substantially eliminates any tendency of the brake to grab or lock when applied. This line $c$—$d$ is fixed as follows: Thrust on link 30 is in a line with pivots 31—32. The pull on pivot 36 is in the direction of rod 35. The line $c$—$d$ must therefore pass through pivot 34 and through the intersection of line 31—32 extended with axis of rod 35. By positioning pivot 32 so that there will be but little swinging movement of link 30, it is seen that the direction of line $c$—$d$ will be unchanged regardless of wear of the brake lining.

As a result of my improved structure as shown and described, it is apparent that with the brakes unapplied, the cooperation of the faces 17, 18, 19 and 20 results in the equalizing bell-cranks being held in neutral positions from which they may swing in either direction to produce equalization of the braking effects. On the other hand, when the brakes are applied, ahead rotation of the drums 10 (clockwise as viewed in Fig. 1) will tend to impart corresponding rotation to the shoes 14, 15. Rotation of said shoes will, however, be arrested by contact of the ends 19 of the shoes 15 with the curved faces 20 of the short arms 16 of the bell-crank C, so that gaps will open up between the opposite or flat faces 18 of the bell-crank arms 16 and the adjacent ends 17 of the shoes 14, which gaps will permit such swinging movement of the bell-cranks C as may be required to effect equalization to take place without either end of the face 18 of either bell-crank coming into contact with the end 17 of the related shoe 14. Thus free movement of the bell-cranks C and of the cross rod 28 to effect equalization is permitted. On the other hand, in the event of brake application to retard rearward rotation of the drums 10, the ends 17 of the shoes 14 will be pressed forcibly against the faces 18 of the bell-crank arms 16, and since said ends 17 and said faces 18 are straight, no equalizing action will occur, but to the contrary each bell-crank, because of the cooperation of said straight faces 17—18, will hold its related shoe 14 in the same position at all times. The bell-cranks C and cross rod 28 operate to effect equalization of the braking effects of the two brakes in the manner set forth in connection with the equalizing bell-cranks and cross rods shown in either of my prior Patents 1,440,842; 1,490,642 or 1,503,609.

As shown in Figs. 2 and 3, the equalizing cross rod 28 is positioned in advance of the steering tie rod 29 and is supported from the latter by steady-rests 38. In some cases however, it may be desirable and advantageous to house the equalizing cross rod within a tubular steering tie rod as shown in Fig. 4 which may be accomplished by providing offset pivots 26' between the steering arms 27' and a tubular tie rod 29' and positioning the pivots 25' connecting the ends of the equalizing bell-cranks and the cross rod 28' in vertical alinement with said pivots 26'.

In the claims the term "braking effect" is used to describe the actual retarding force which a braked wheel exerts on the ground. This may or may not correspond to the brake force as it is not only dependent upon this force, but also upon the adhesion or holding power of the tire on the ground. For instance, if this adhesion is low, the brake force may be sufficient to lock the wheel and any further brake force applied would be ineffectual to increase this "braking effect".

I claim:

1. In a brake system, the combination with a pair of vehicle steering wheels angularly movable about spaced axes to effect steering, a brake for each wheel consisting of a wheel carried drum and a cooperating brake element, and steering mechanism for said wheels including a steering arm extending from each wheel and a tie rod pivotally connected at its ends with said arms, respectively; of means anchoring said brake elements consisting of a pair of bell-cranks corresponding arms of which are in operative engagement with said brake elements, respectively, and a cross rod the ends of which are pivotally connected with the other arms of said bell-cranks, respectively, the pivots between the ends of said cross rod and said bell-crank arms being located, when the wheels are positioned for straight ahead steering and when the brakes are unapplied, on lines passing through the steering axes of said wheels and the pivotal connections between said tie rod and said steering arms, respectively.

2. In a brake system, the combination with a pair of steering wheels angularly movable about spaced axes to effect steering, a brake for each wheel, and steering mechanism for said wheels including a steering arm extending from each wheel and a tie rod connecting said arms, of means anchoring said brakes against all similarly directed rotary movements, consisting of a pair of bell-cranks operatively connected with said brakes, respectively, and connected together by a cross rod, said tie rod being hollow and said cross rod being housed within said tie rod.

3. In a brake system, the combination with a pair of steering wheels angularly movable about spaced axes to effect steering, a brake for each wheel, and steering mechanism for said wheels including a steering arm extending from each wheel and a tie rod connecting said arms; of means anchoring said brakes against all similarly directed rotary movements consisting of a pair of bell-cranks operatively connected with said brakes, respectively, and connected together by a cross rod, one of said rods being hollow and the other being housed therein.

4. In a brake system of the band type, the combination with duplicate full wrap brake bands and a common brake band operating device, of means between the bands cooperating with one end of each of said bands and with said device through the bands to equalize the braking effects of the latter.

5. In a brake system including duplicate brakes and a common brake applying device, the combination of two full wrap brake elements, in which gaps are provided between the ends thereof, an anchoring mechanism extending between the brakes and into said gaps movable in either direction from a neutral position and cooperating with said device to effect equalization of the braking effects of said brakes, and means whereby said brake elements hold said anchoring mechanism in neutral position when the brakes are unapplied.

6. In a brake system, the combination with a pair of brakes of the full wrap type; of a common brake applying mechanism and anchoring means engaging the ends of said brakes and cooperating with said mechanism to equalize the braking effects of said brakes.

7. In a brake system, the combination with a pair of brakes of the internal expanding full wrap type; of a common brake expanding mechanism and anchoring means engaging the ends of said brakes and cooperating with said mechanism to equalize the braking effects of said brakes.

8. In a brake system, the combination with a pair of brakes of the internal full wrap type, in which gaps are provided between the ends of the brakes, respectively, of a common brake applying mechanism and brake anchoring means extending between the brakes and into said gaps for engaging the ends of the brakes and cooperating with said mechanism to equalize the braking effect of said brakes.

9. In a brake system, the combination with a pair of brakes of the internal expanding full wrap band type, of a common brake expanding mechanism and anchoring means engaging the bands of said brakes between the ends thereof and cooperating with said mechanism to equalize the braking effects of said brakes, said means being in contact with both ends of the bands when the latter are contracted.

10. In a brake system, the combination with a pair of brakes of the internal full wrap type; of means anchoring said brakes against all similarly directed rotary movements, said means consisting of a pair of pivotally mounted bell cranks corresponding arms of which are disposed between the ends of said brakes respectively, and the other arms of which are connected by a cross rod.

11. In a brake system, the combination with a pair of brakes of the internal expanding full wrap type; of a common brake expanding mechanism and means anchoring said brakes consisting of a pair of pivotally mounted bell-cranks corresponding arms of which are disposed between and in contact with the ends of said brakes, respectively, when the latter are contracted, and the other arms of which are connected together by a cross-rod, said means cooperating with said mechanism to equalize the braking effects of said brakes.

12. In a brake system, the combination with a pair of vehicle steering wheels angularly movable about spaced axes to effect steering, and a brake for each wheel consisting of a wheel carried drum and a cooperating brake element; of means anchoring said brake elements consisting of a pair of bell-cranks, mounted on pivots substantially parallel to said spaced axes; corresponding arms of which bell-cranks are in operative engagement with said brake elements, respectively, and the other arms of which are pivotally connected by a cross-rod, said pivotal connections being positioned to cause said bell-cranks to partake of the same angular movements as said wheels when the brakes are unapplied.

In testimony whereof I hereunto affix my signature.

GEORGE L. SMITH.